US012516867B2

(12) United States Patent
Eom et al.

(10) Patent No.: US 12,516,867 B2
(45) Date of Patent: Jan. 6, 2026

(54) REFRIGERATOR

(71) Applicant: SAMSUNG ELECTRONICS CO., LTD., Suwon-si (KR)

(72) Inventors: Taein Eom, Suwon-si (KR); Daesung Ki, Suwon-si (KR); Chanyoung Park, Suwon-si (KR); Hyunuk Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 129 days.

(21) Appl. No.: 18/074,606

(22) Filed: Dec. 5, 2022

(65) Prior Publication Data

US 2023/0095878 A1 Mar. 30, 2023

Related U.S. Application Data

(63) Continuation of application No. PCT/KR2021/005349, filed on Apr. 28, 2021.

(30) Foreign Application Priority Data

Jun. 22, 2020 (KR) .......................... 10-2020-0075897
Oct. 13, 2020 (KR) .......................... 10-2020-0131910

(51) Int. Cl.
F25D 23/02 (2006.01)
E05F 15/00 (2015.01)
(Continued)

(52) U.S. Cl.
CPC ............ F25D 23/028 (2013.01); E05F 15/00 (2013.01); E05F 15/611 (2015.01);
(Continued)

(58) Field of Classification Search
CPC .... F25D 23/028; F25D 2700/02; E05F 15/00; E05F 15/611; E05F 15/614;
(Continued)

(56) References Cited

U.S. PATENT DOCUMENTS 10,301,864 B2   5/2019   Yasaka et al.
10,301,865 B2   5/2019   Son et al.
(Continued)

FOREIGN PATENT DOCUMENTS

CN    108316802 A    7/2018
CN    109707264 B    11/2020
(Continued)

OTHER PUBLICATIONS

European Search Report dated Oct. 24, 2023 in European Patent Application No. 21828659.9.
(Continued)

Primary Examiner — Kimberley S Wright
(74) Attorney, Agent, or Firm — STAAS & HALSEY LLP

(57) ABSTRACT

A refrigerator comprising a door rotatable about a hinge shaft. A door opening and closing apparatus comprises a drive motor, a first gear configured to receive power from the drive motor, a second gear, spaced apart from the first gear, configured to transmit a rotational force to the hinge shaft, a clutch gear configured to be rotatable around a rotation axis of the first gear, and configured to transmit power of the first gear to the second gear based on a position of the clutch gear around the rotation axis of the first gear, and a position detection sensor configured to detect the position of the clutch gear so that while the clutch gear is at the position, the clutch gear transmits the power received from the first gear to the second gear which transmits the rotational force to the hinge shaft to open and close the door.

15 Claims, 19 Drawing Sheets

(51) Int. Cl.
  E05F 15/611  (2015.01)
  E05F 15/614  (2015.01)
  F25D 29/00   (2006.01)

(52) U.S. Cl.
  CPC ... *E05Y 2201/216* (2013.01); *E05Y 2201/232* (2013.01); *E05Y 2201/43* (2013.01); *E05Y 2201/626* (2013.01); *E05Y 2201/716* (2013.01); *E05Y 2400/36* (2013.01); *E05Y 2900/31* (2013.01); *F25D 2323/024* (2013.01)

(58) Field of Classification Search
  CPC .......... E05Y 2900/31; E05Y 2201/426; E05Y 2201/216; E05Y 2201/232; E05Y 2201/626; E05Y 2201/716; E05Y 2400/36
  See application file for complete search history.

(56) References Cited

U.S. PATENT DOCUMENTS

| | | | |
|---|---|---|---|
| 10,591,202 B2 | 3/2020 | Kim et al. | |
| 10,995,536 B2 | 5/2021 | Song et al. | |
| 12,000,645 B2* | 6/2024 | Schroeder | F25D 23/028 |
| 2017/0097185 A1* | 4/2017 | Yasaka | E05F 15/614 |
| 2017/0260794 A1* | 9/2017 | Son | E05F 15/619 |
| 2017/0261252 A1* | 9/2017 | Son | F25D 23/028 |
| 2017/0336132 A1* | 11/2017 | Chang | F25D 23/028 |
| 2018/0128537 A1* | 5/2018 | Kim | F25D 29/00 |
| 2018/0223582 A1* | 8/2018 | Shin | E05F 15/619 |
| 2018/0291669 A1* | 10/2018 | Kim | F25D 23/028 |
| 2018/0334844 A1* | 11/2018 | Eom | F25D 23/028 |
| 2018/0334846 A1* | 11/2018 | Eom | E05F 15/73 |
| 2020/0263479 A1* | 8/2020 | Lee | F25D 23/028 |

FOREIGN PATENT DOCUMENTS

| | | |
|---|---|---|
| EP | 10-2018-0080080 | 7/2018 |
| JP | 8-23249 B2 | 3/1996 |
| JP | 2005-326044 | 11/2005 |
| JP | 2005-326044 A | 11/2005 |
| JP | 2010-25461 A | 2/2010 |
| KR | 10-2009-0091455 A | 8/2009 |
| KR | 10-2012-0003772 A | 1/2012 |
| KR | 10-1655801 B1 | 9/2016 |
| KR | 10-2017-0040738 A | 4/2017 |
| KR | 10-2017-0094548 A | 8/2017 |
| KR | 10-2017-0112924 A | 10/2017 |

OTHER PUBLICATIONS

Extended European Search Report dated Sep. 12, 2023 in European Patent Application No. 21828659.9.
International Search Report issued in International Application No. PCT/KR2021/005349 dated Aug. 13, 2021.
International Written Opinion issued in International Application No. PCT/KR2021/005349 dated Aug. 13, 2021.
European Office Action dated May 28, 2025 for European Application No. 21828659.9.

\* cited by examiner

REFRIGERATOR

CROSS-REFERENCE TO RELATED APPLICATION(S)

This application is a continuation application, under 35 U.S.C. § 111(a), of international application No. PCT/KR2021/005349, filed on Apr. 28, 2021, which claims priority to Korean Patent Application No. 10-2020-0075897, filed on Jun. 22, 2020, and Korean Patent Application No. 10-2020-0131910, filed Oct. 13, 2020, in the Korean Intellectual Property Office, the disclosures of which are incorporated by reference herein in their entirety.

BACKGROUND

Field

The present disclosure relates to a refrigerator, and more particularly, to a refrigerator including an improved door opening and closing structure.

Description of Related Art

In general, a refrigerator is a device that keeps food fresh by including a storage compartment and a cold air supply device configured to supply cold air to the storage compartment.

The storage compartment is maintained at a temperature within a certain range required to keep the food fresh.

The storage compartment of the refrigerator is provided with an open front surface and the open front surface is closed by a door so as to maintain the temperature of the storage compartment.

The door may be opened and closed manually, but may also be opened and closed automatically using a separate power.

SUMMARY

One aspect of the present disclosure provides a refrigerator including a housing, a door configured to be rotatable about a hinge shaft, and a door opening and closing apparatus configured to open and close the door. The door opening and closing apparatus includes a drive motor, a first gear configured to receive power from the drive motor, a second gear, spaced apart from the first gear, and configured to transmit a rotational force to the hinge shaft, a clutch gear configured to be rotatable around a rotation axis of the first gear and transmit power of the first gear to the second gear based on a position of the clutch gear around the rotation axis of the first gear, and a position detection sensor configured to detect the position of the clutch gear so that while the clutch gear is at the position, the clutch gear transmits the power received from the first gear to the second gear which transmits the rotational force to the hinge shaft to open and close the door.

The door opening and closing apparatus may further include a detection target configured to be rotatable together with the clutch gear around the rotation axis of the first gear, and detectable by the position detection sensor. The detection target may be arranged along an axial direction of the clutch gear.

In response to the power of the first gear being transmitted to the second gear by the clutch gear, the detection target may be positioned to face the position detection sensor so as to be detected by the position detection sensor.

In response to the power of the first gear not being transmitted to the second gear, the detection target may be laterally spaced apart from the position detection sensor so as to be undetected by the position detection sensor.

The clutch gear may be a first clutch gear and the position detection sensor may be a first position detection sensor. The door opening and closing apparatus may further include a second clutch gear configured to be rotatable around the rotation axis of the first gear and transmit power of the first gear to the second gear based on a position of the second clutch gear around the rotation axis of the first gear, and a second position detection sensor spaced apart from the first position detection sensor and configured to detect the detection target.

The first clutch gear and the second clutch gear may be connected to the first gear to receive power from the drive motor through the first gear; and the first clutch gear and the second clutch gear may be connected to and disconnected from the second gear.

While the door is being opened, the first clutch gear may transmit power to the second gear, and the detection target may be positioned to face the first position detection sensor and detected by the first position detection sensor.

In response to the completion of the opening of the door, the first clutch gear may be separated from the second gear, and the detection target may be positioned in a neutral region between the first position detection sensor and the second position detection sensor, so as not to be detected by the first position detection sensor and the second position detection sensor.

While the door is being closed, the second clutch gear may transmit power to the second gear, and the detection target may be positioned to face the second position detection sensor and detected by the second position detection sensor.

In response to the completion of the closing of the door, the second clutch gear may be separated from the second gear, and the detection target may be positioned in the neutral region between the first position detection sensor and the second position detection sensor, so as not to be detected by the first position detection sensor and the second position detection sensor.

The first clutch gear may be connected to the second gear in response to a rotation of the drive motor in a first direction, and the first clutch gear may be separated from the second gear in response to the rotation of the drive motor in a second direction. The second clutch gear may be connected to the second gear in response to the rotation of the drive motor in the second direction, and the second clutch gear may be separated from the second gear in response to the rotation of the drive motor in the first direction.

The door opening and closing apparatus may further include a support frame provided to support the first clutch gear and the second clutch gear where the first clutch gear and the second clutch gear are configured to be rotatable on a side the support frame. The detection target may be arranged on another side of the support frame opposite to the side of the support frame on which the first clutch gear and the second clutch gear are arranged.

The door opening and closing apparatus may further include a pressing protrusion configured to be rotatable together with the first gear, a slider configured to extend in one direction and slide by being pressed by the pressing protrusion, and a lever configured to be rotatable by the slider and push the housing to move the door which is closed to an opening direction. The slider may include a coupling groove, and the lever may include a coupling protrusion. As the coupling protrusion is inserted into the coupling groove, the lever may be coupled to the slider.

A separation space may be formed between an inner surface of the coupling groove and the coupling protrusion. While the slider is not being pressed by the pressing protrusion, the coupling protrusion may be spaced apart from the inner surface of the coupling groove, in a direction in which the slider extends.

The position detection sensor may include a Hall sensor and the detection target may include a magnet.

Another aspect of the present disclosure provides a refrigerator including a housing in which a storage compartment is formed, a door configured to be rotatable about a hinge shaft and configured to open and close the storage compartment, a drive motor configured to output power for rotating the door, a center gear provided to receive the power from the drive motor, a hinge gear fixed to the hinge shaft, a gear assembly configured to intermittently transmit power from the center gear to the hinge gear according to a position and including a pair of clutch gears configured to revolve around a rotation axis of the center gear and configured to intermittently transmit power to the hinge gear, and a plurality of Hall sensors arranged to be spaced apart from each other and configured to detect a position of the gear assembly.

The gear assembly may include a support frame in which one of the pair of clutch gears is arranged at one end and the other end thereof, and configured to be rotated coaxially with the center gear, and the plurality of hall sensors may detect a position of the support frame.

In response to power being transmitted from the center gear to the hinge gear by the gear assembly, one end of the support frame may face one of the plurality of Hall sensors and detected by the one of the plurality of Hall sensors.

In response to power not being transmitted from the center gear to the hinge gear by the gear assembly, one end of the support frame may be arranged between the plurality of Hall sensors and may not be detected by the plurality of Hall sensors.

The support frame may further include a magnet provided at one end of the support frame to correspond to the plurality of Hall sensors and detected by the plurality of Hall sensors.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
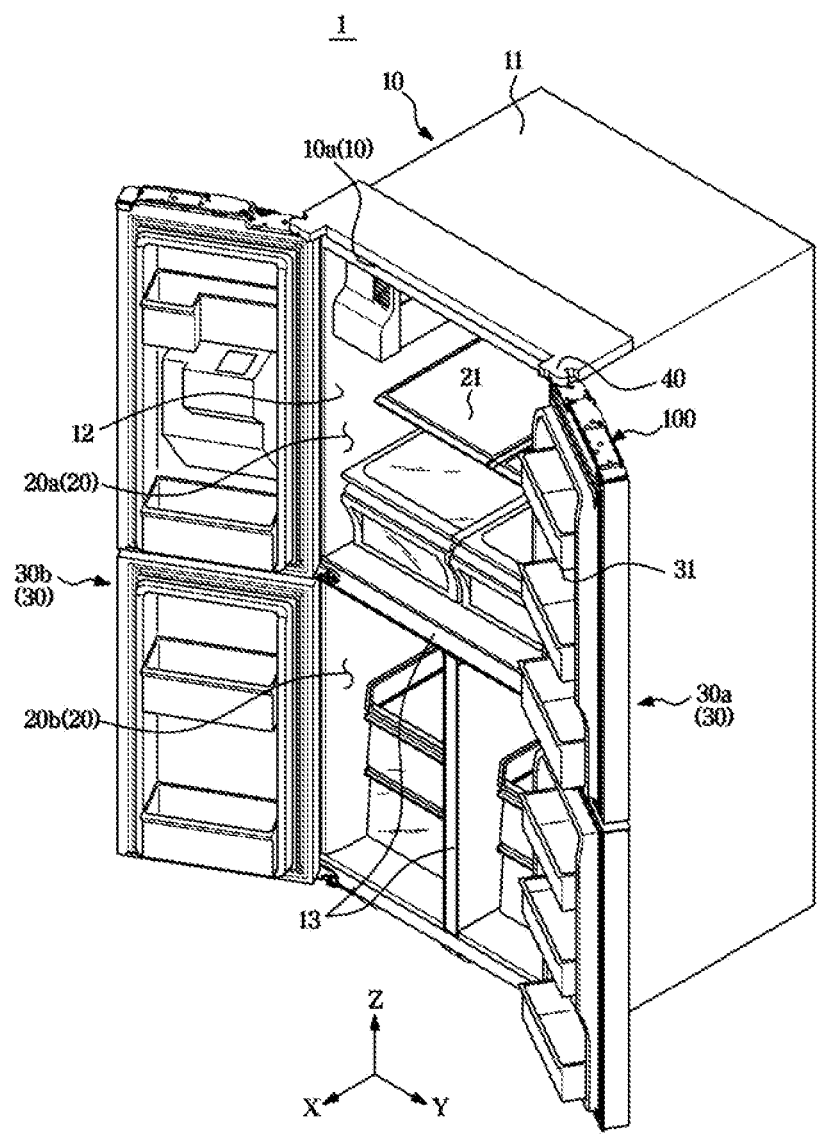
FIG. 1 is a view illustrating a refrigerator according to one embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function. Shapes and sizes of elements in the drawings may be exaggerated for clear description.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "upper portion", "lower portion", and the like may be defined by the drawings, but the shape and the location of the component is not limited by the term.

The present disclosure is directed to providing a refrigerator including an improved door opening and closing structure capable of allowing a door to be manually opened and closed and to be automatically opened and closed by a door opening and closing apparatus.

Further, the present disclosure is directed to providing a refrigerator including a door opening and closing apparatus including an improved power transmission structure.

A drive motor may be selectively interlocked with a hinge gear by a gear assembly, and the drive motor, which acts as a resistance when a door is manually opened and closed, may be separated from the hinge gear by the gear assembly. Accordingly, a user can easily open and close the door manually.

Further, when a gear assembly is rotated to a neutral position, it is possible to prevent a lever from being unintentionally operated or to prevent the lever from not returning to the neutral position.

Hereinafter exemplary embodiments of the present disclosure will be described in detail with reference to the accompanying drawings.

Figure 2:
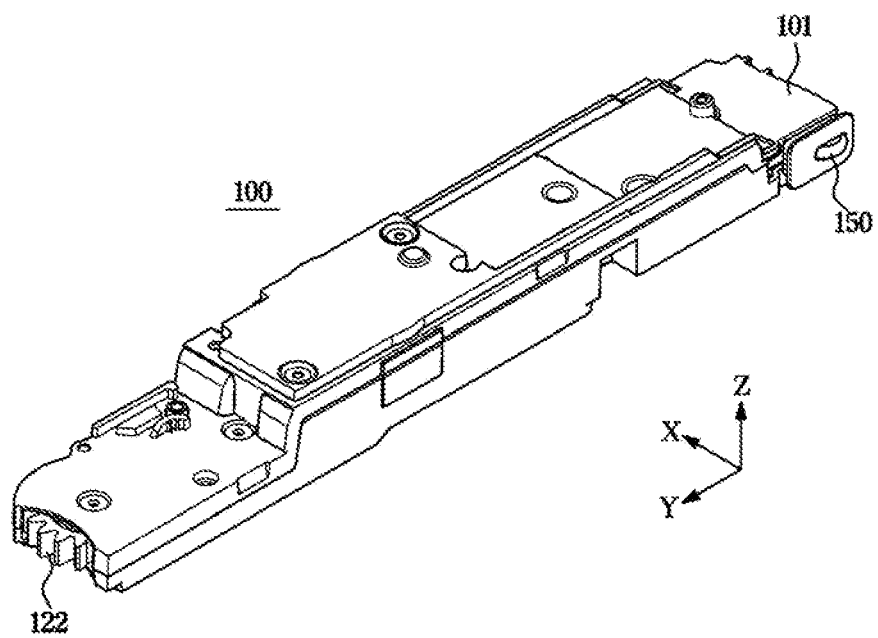
FIG. 2 is a rear-perspective view illustrating a door opening and closing apparatus of the refrigerator shown in FIG. 1 according to an embodiment of the present disclosure.
Figure 3:
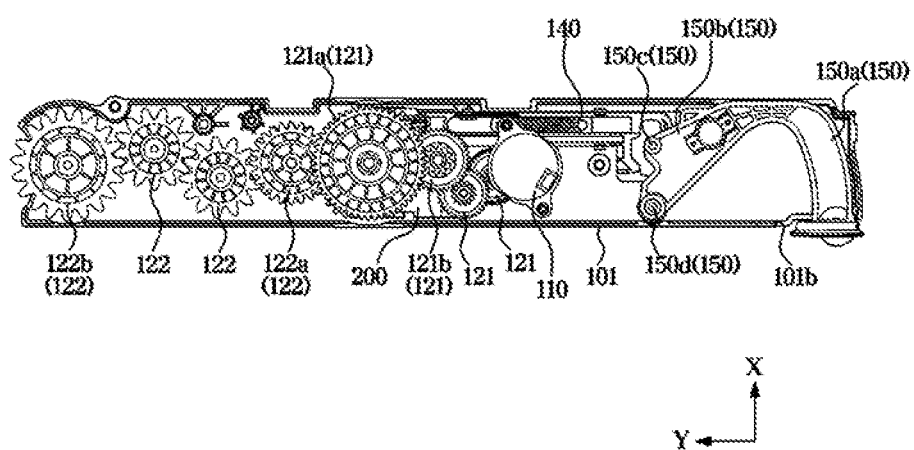
FIG. 3 is a top view illustrating the door opening and closing apparatus shown in FIG. 2 according to an embodiment of the present disclosure.
Figure 4:
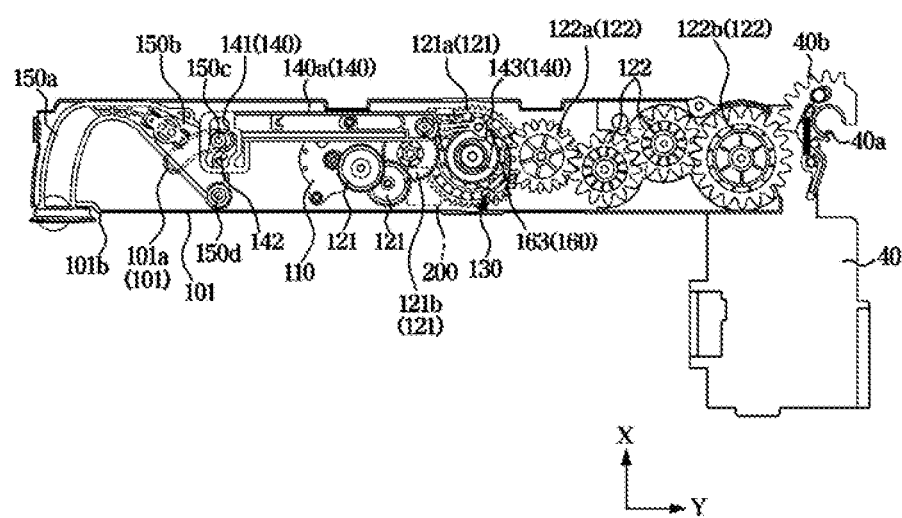
FIG. 4 is a bottom view illustrating the door opening and closing apparatus shown in FIG. 2 according to an embodiment of the present disclosure.
Figure 5:
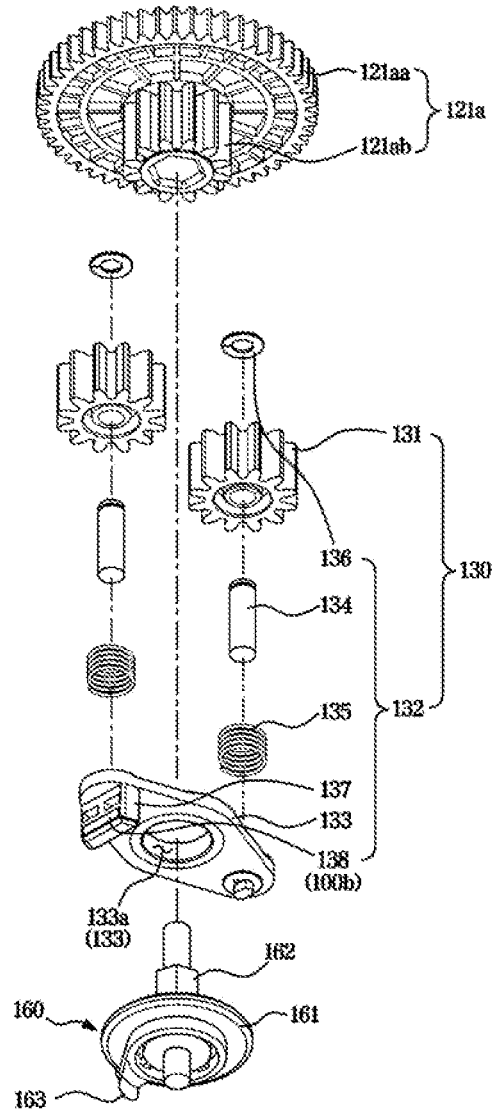
FIG. 5 is a partially exploded-view illustrating the door opening and closing apparatus shown in FIG. 3 according to an embodiment of the present disclosure.
Figure 6:
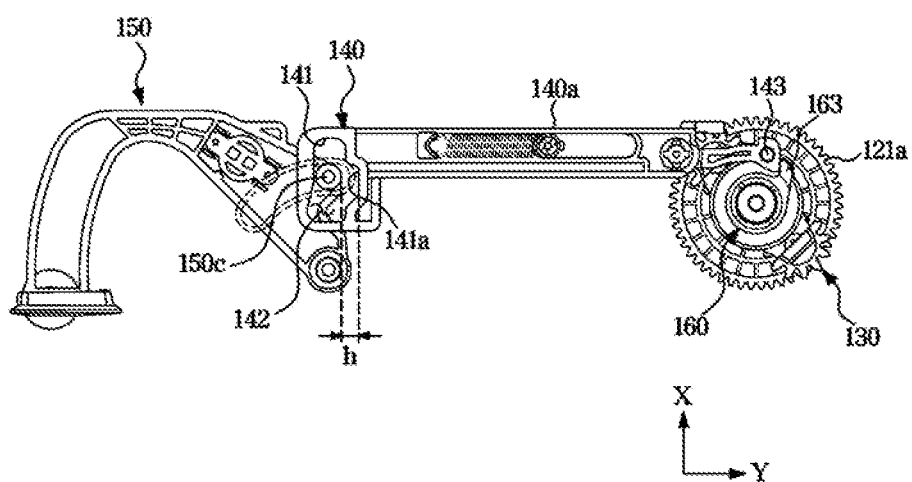
FIG. 6 is a view illustrating a partial configuration of the door opening and closing apparatus shown in FIG. 4 according to an embodiment of the present disclosure.

FIG. 1 is a view illustrating a refrigerator according to one embodiment of the present disclosure. FIG. 2 is a rear-perspective view illustrating a door opening and closing apparatus of the refrigerator shown in FIG. 1. FIG. 3 is a top view illustrating the door opening and closing apparatus shown in FIG. 2. FIG. 4 is a bottom view illustrating the door opening and closing apparatus shown in FIG. 2. FIG. 5 is a partially exploded-view illustrating the door opening and closing apparatus shown in FIG. 3. FIG. 6 is a view illustrating a partial configuration of the door opening and closing apparatus shown in FIG. 4.

Referring to FIGS. 1 to 6, a refrigerator 1 includes a housing 10 including a main body and a front surface that is partially open, a storage compartment 20 arranged inside the housing 10 and provided with an open front surface, and a door 30 rotatably coupled to the housing 10 to open and close the open front surface of the storage compartment 20.

The housing 10 includes an inner case 11 forming the storage compartment 20 and an outer case 12 forming an exterior of the refrigerator. A cold air supply device (not shown) configured to supply cold air to the storage compartment 20 is arranged inside the housing 10.

The cold air supply device may include a compressor, a condenser, an expansion valve, an evaporator, a fan, a cold air duct, etc., and an insulating material (not shown) is foamed between the inner case 11 and the outer case 12 of the housing 10 so as to prevent leakage of cold air of the storage compartment 20.

The storage compartment 20 may be divided into a refrigerating compartment 20a and a freezing compartment 20b by a partition wall 13. The refrigerating compartment 20a and the freezing compartment 20b may be opened and closed by a refrigerating compartment door 30a and a freezing compartment door 30b rotatably coupled to the main body. A plurality of door guards 31 in which food is stored may be installed on a rear surface of the door 30.

The door 30 may be opened and closed manually by a user, or may be opened and closed automatically by a door opening and closing apparatus 100. The door opening and closing apparatus 100 may include a drive motor 110 provided therein, and may open and close the door 30 by using power of the drive motor 110. The door 30 may be coupled to a hinge 40 so as to be rotated about a hinge shaft 40a of the hinge 40 fixed to the housing 10. The hinges 40 provided on the left and right sides of the housing 10 on the same height may be integrally formed and at the same time, form a part of a front surface 10a of the housing 10. However, the disclosure is not limited thereto, and the hinges 40 may be separately provided on the left and right sides.

A plurality of shelves 21 may be provided inside the storage compartment 20 to partition the refrigerating compartment 20a and the freezing compartment 20b into a plurality of spaces, respectively. The shelf 21 may be detachably mounted on a protrusion (not shown) provided in the storage compartment 20.

Hereinafter the door opening and closing apparatus 100 will be described in detail. The door 30 to be described below may include the refrigerating compartment door 30a and the freezing compartment door 30b. The door opening and closing apparatus 100 may be provided to correspond to all or some doors of the refrigerator 1. The refrigerator 1 may include a plurality of door opening and closing apparatuses 100. Contents to be described below relate to the door opening and closing apparatus 100 for a door located on the right side when the refrigerator 1 is viewed from the front, but the same may be applied to a door opening and closing apparatus 100 for a door located on the left side when the refrigerator 1 is viewed from the front.

The door opening and closing apparatus 100 may be provided on one side of the door 30. Particularly, the door opening and closing apparatus 100 may be arranged at an upper end of the door 30. However, the disclosure is not limited thereto. Alternatively, the door opening and closing apparatus 100 may be arranged at a lower end of the door 30. Alternatively, the door opening and closing apparatus 100 may be arranged on the housing 10 to correspond to the upper end or the lower end of the door.

The door opening and closing apparatus 100 may include a case 101 forming an exterior thereof, the drive motor 110 provided inside the case 101 and configured to output power for opening and closing the door 30, and a plurality of gears 121, 122, and 131 arranged inside the case 101 and configured to transmit the power of the drive motor 110 to the hinge shaft 40a.

An opening 101b may be provided at one side of the case 101 to allow a pusher 150a of a lever 150 to be described later to pass and to protrude to the outside of the case 101. The opening 101b is formed on a rear surface of the case 101 facing the front surface of the housing 10. The drive motor 110 may rotate in both directions, and may transmit power to a hinge gear 40b fixed to the hinge shaft 40a via the plurality of gears 121, 122, and 131. Meanwhile, the hinge 40 may include the hinge shaft 40a and the hinge gear 40b.

In this case, the hinge gear 40*b* may be firmly fixed to the hinge shaft 40*a*, and thus in response to the rotation of the gear 122, which meshes with the hinge gear 40*b*, by the power of the drive motor 110, a gear 122*b* meshing with the hinge gear 40*b* may be moved along teeth of the hinge gear 40*b* to rotate around the hinge shaft 40*a*, and the door opening and closing apparatus 100 and the door 30 connected to the door opening and closing apparatus 100 may be rotated with respect to the hinge shaft 40*a*.

The door opening and closing apparatus 100 may include a gear assembly 130 arranged between the drive motor 110 and the hinge 40 to allow the power of the drive motor 110 to be intermittently transmitted to the hinge gear 40*b*, and intermittently connected to the hinge shaft 40*a*. With respect to the gear assembly 130, at least one gear for interlocking the drive motor 110 with the gear assembly 130 may correspond to a motor-side gear 121, and at least one gear for interlocking the gear assembly 130 with the hinge gear 40*b* may correspond to a hinge-side gear 122. That is, the motor-side gear 121 and the hinge-side gear 122 may be interlocked through the gear assembly 130, and the gear assembly 130 may intermit the power transmitted from the motor-side gear 121 to the hinge-side gear 122.

The gear assembly 130 may include a pair of clutch gears 131 connected to a center gear 121*a*, which is interlocked with the drive motor 110, as one of the motor-side gears 121, and revolving around the center gear 121*a*, and a support frame 132 configured to allow the clutch gear 131 to rotate along a circumference of the center gear 121*a* with respect to a rotation axis of the center gear 121*a*. The clutch gear 131 may correspond to a swing gear that meshes with the center gear 121*a* and revolves around the center gear 121*a*.

The center gear 121*a* may include a first gear 121*aa* having a spur gear shape and a second gear 121*ab* having a spur gear shape having a smaller diameter than the first gear 121*aa*. The first gear 121*aa* and the second gear 121*ab* may be provided integrally such that a rotation axis thereof coincides with each other. The center gear 121*a* may receive power of the drive motor 110 from a motor-side gear 121*b* meshing with the first gear 121*aa* and rotate about a central axis thereof as a rotation axis.

The rotation axis of the support frame 132 may be provided coaxially with the rotation axis of the center gear 121*a*. The rotation axis of the support frame 132 may correspond to an axis of revolution of the clutch gear 131 revolving around the center gear 121*a*.

The clutch gear 131 may be respectively mounted at opposite ends of the support frame 132. Particularly, the support frame 132 may include a plate 133 including a through hole 133*a* formed therein, and a pair of clutch gear mounting shafts 134 arranged at opposite ends of the plate 133. The clutch gear mounting shaft 134 may penetrate the corresponding clutch gear 133 and thus the clutch gear 133 may be rotatably coupled to the clutch gear mounting shaft 134.

The pair of clutch gear mounting shafts 134 are arranged on the plate 133 and arranged symmetrically with respect to the rotation axis of the support frame 132. Accordingly, the rotation axis of the pair of clutch gears 131 and the rotation axis of the support frame 132 may be arranged on one straight line.

The support frame 132 may include a pair of pressing springs 135. The pressing spring 135 may be penetrated by the clutch gear mounting shaft 134 and coupled to the clutch gear mounting shaft 134, and arranged between the plate 133 of the support frame 132 and the clutch gear 131. The pressing spring 135 may apply an elastic force to a direction in which the plate 133 and the clutch gear 131 are moved away from each other.

The support frame 132 may include a pressing member 136. The pressing member 136 may be arranged on an opposite side of the pressing spring 135 with respect to the clutch gear 131, and coupled to the clutch gear mounting shaft 134, and may press the clutch gear 131. Based on FIG. 5, because the clutch gear 131 is pressed upward by the pressing spring 135 and is in close contact with the pressing member 136, a load may be applied to a rotation of the clutch gear 131 with respect to the clutch gear mounting shaft 134.

The clutch gear 131 may mesh with the center gear 121*a*. Particularly, the clutch gear 131 may mesh with the second gear 121*ab* of the center gear 121*a*. Accordingly, the clutch gear 131 may receive the power of the drive motor 110 from the center gear 121*a*, and the clutch gear 131 may be interlocked with the drive motor 110 via the center gear 121*a*.

The clutch gear 131 may intermittently mesh with one gear 122*a* of the hinge-side gears 122. Accordingly, the clutch gear 131 may be connected to and interlocked with the hinge gear 40*b* via the hinge-side gear 122.

The door opening and closing apparatus 100 may include a plurality of position detection sensors 100*a* configured to detect a position of the gear assembly 130 so as to determine whether the motor-side gear 121 and the hinge-side gear 122 are interlocked with each other.

Particularly, the plurality of position detection sensors 100*a* may include a first position detection sensor and a second position detection sensor spaced apart from the first position detection sensor. The door opening and closing apparatus 100 may include a printed circuit board 200 on which the first position detection sensor and the second position detection sensor are mounted. The position detection sensor 100*a* may include various sensors configured to detect the position of the gear assembly 130, such as a Hall sensor and an optical sensor.

The position detection sensor 100*a* may detect a detection target 100*b* provided in the gear assembly 130 when the detection target 100*b* is arranged to face the position detection sensor 100*a*. The detection target 100*b* may have a shape that corresponds to the position detection sensor 100*a* so as to be detected by the position detection sensor 100*a*, but is not limited thereto. Alternatively, the position detection sensor 100*a* may be provided in the gear assembly 130 and the detection target 100*b* corresponding to the position detection sensor 100*a* may be separated from the gear assembly 130.

The door opening and closing apparatus 100 as illustrated in FIG. 2 may include a Hall sensor 201 as example of the position detection sensor 100*a*. The support frame 132 may include a magnet 138, corresponding to the detection target 100*b*, provided at one end of the plate 133 and corresponding to the Hall sensor 201. The Hall sensor 201 may detect a magnetic field of the magnet 138 so as to detect a position of the magnet 138.

Particularly, the magnet 138 may be provided on the other side of the plate 133 opposite to one side of the plate 133 on which the clutch gear 131 is arranged. That is, the magnet 138 may be arranged under the clutch gear 131 based on FIG. 5. Particularly, the support frame 132 may include a magnet receiver 137 protruding from the other side of the plate 133, and the magnet 138 may be mounted to the magnet receiver 137.

The clutch gear 131 is provided in a pair, and thus the clutch gear 131 under which the magnet 138 is arranged may be referred to as a first clutch gear 131a, and the clutch gear 131 under which the magnet 138 is not arranged may be referred to as a second clutch gear 131b. The magnet 138 and the first clutch gear 131a may be arranged in a vertical direction. The magnet 138 and the first clutch gear 131a may be arranged in a direction of a rotation axis of the center gear 121a around which the first clutch gear 131a revolves. The magnet 138 and the first clutch gear 131a may be arranged in a direction of the rotation axis of the first clutch gear 131a. Together with the first clutch gear 131a, the magnet 138 may revolve around the center gear 121a in response to the rotation of the support frame 132.

Because the printed circuit board 200, on which the Hall sensor 201 is mounted, is arranged under the gear assembly 130 based on FIGS. 1 to 6, the Hall sensor 201 and the magnet 138 may be arranged to face each other according to a rotation position of the support frame 132, and the Hall sensor 201 may detect the magnetic field of the magnet 138 facing the Hall sensor 201. The magnet 138 and the first clutch gear 131a may revolve around the rotation axis of the center gear 121a in a state in which the magnet 138 and the first clutch gear 131a are arranged side by side in the axial direction. Accordingly, the Hall sensor 201 may detect the position of the first clutch gear 131a by detecting the magnet 138.

The door opening and closing apparatus 100 may include the lever 150 provided in contact with the front surface 10a of the housing 10 to press and push the housing 10 so as to move the door 30 to a direction in which the door 30 is opened, a slider 140 configured to slide to transmit the power of the drive motor 110 to the lever 150, and an operation frame 160 configured to be rotated in conjunction with the center gear 121a and provided to press the slider 140 to allow the slider 140 to slide. The lever 150, the slider 140, and the operation frame 160 may be provided inside the case 101.

The operation frame 160 may include a disk 161 supporting the plate 133 of the support frame 132, an insertion shaft 162 protruding from approximately the center of one side of the disk 161 to form a rotation axis of the disk 161, and a pressing protrusion 163 provided at a position spaced apart from the rotation axis of the operation frame 160 to protrude from the other side of the disk 161. The operation frame 160 may include a pair of pressing protrusions 163 provided symmetrical to each other.

Based on FIG. 5, the insertion shaft 162 of the operation frame 160 may protrude to an upper side of the disk 161 to be inserted into the through hole 133a of the support frame 132, and the insertion shaft 162 passing through the through hole 133a of the support frame 132 may be inserted into and fixed to the center gear 121a. The insertion shaft 162 and the rotation axis of the center gear 121a may coincide with each other. Accordingly, the operation frame 160 may be rotated coaxially with the center gear 121a. The operation frame 160 may be interlocked with the drive motor 110 via the center gear 121a. The center gear 121a, the operation frame 160, and the gear assembly 130 may be rotated in the same direction.

The slider 140 may include an extension 140a extending in the left and right direction based on FIGS. 3, 4 and 6, a pressed member 143 provided at one end of the operation frame 160 to be pressed by the pressing protrusion 163 of the operation frame 160, and a coupling groove 141 provided on the other end side of the extension 140a and into which a part of the lever 150 is inserted and coupled.

The lever 150 may include the pusher 150a provided in such a way that one end thereof is in contact with the housing 10 and in response to the opening of the door 30, the one end thereof protrudes from the case 101 to push the housing 10 so as to separate the door 30 from the housing 10, and a body 150b bent from the other end of the pusher 150a and extended, provided with a rotating shaft 150d formed at one end thereof, and rotatably coupled to the case 101. Particularly, the pusher 150a may come into contact with and push the front surface 10a of the housing 10, but is not limited thereto. Alternatively, the pusher 150a may come into contact with the other surface of the housing 10 or other members fixed to the housing.

The lever 150 may include a coupling protrusion 150c. The coupling protrusion 150c may protrude from the body 150b and one end thereof may be inserted into and coupled to the coupling groove 141 of the slider 140 and the other end thereof may be inserted into a guide groove 101a formed in the case 101, so as to allow a movement of the coupling protrusion 150c to be guided. Particularly, at a position spaced apart from the rotating shaft 150d of the lever 150, the coupling protrusion 150c may be formed to protrude upward and downward from the body 150b of the lever 150. The pusher 150a, the body 150b, and the coupling protrusion 150c may be integrally formed with each other.

The slider 140 may slide in response to the pressed member 143 being pressed by the pressing protrusion 163 of the operation frame 160 provided to be rotated by receiving power from the drive motor 110. In response to the sliding of the slider 140, the lever 150 may push the housing 10 to allow the door 30 to be separated from the housing 10.

Figure 7:
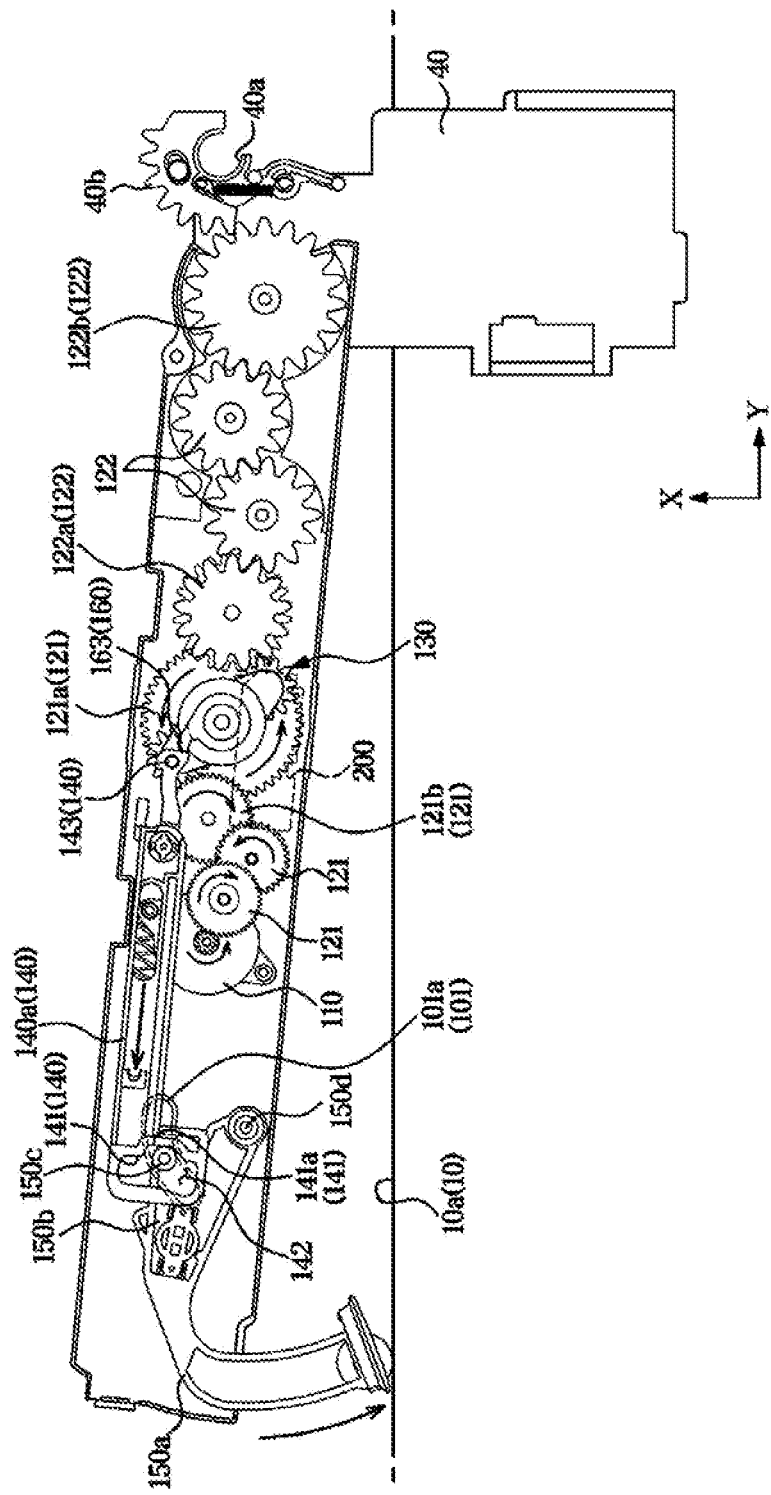
FIG. 7 is a view illustrating a state in which a door is being separated from a housing by the door opening and closing apparatus shown in FIG. 4 according to an embodiment of the present disclosure.

FIG. 7 is a view illustrating a state in which a door is being separated from a housing by the door opening and closing apparatus shown in FIG. 4.

In response to the pressed member 143 not being pressed by the pressing protrusion 163, the lever 150 may be accommodated in the case 110 and not push the housing 10 as illustrated in FIGS. 3 and 4. Referring to FIG. 7, in response to the pressed member 143 being pressed by the pressing protrusion 163, the slider 140 may slide toward the lever 150, and an inner surface of the coupling groove 141 of the slider 140 may press the coupling protrusion 150c of the lever 150 and by a force applied to the coupling protrusion 150c, the movement of the lever 150 may be guided by the guide groove 101a and then rotated with respect to the rotating shaft 150d.

As mentioned above, as the slider 140, which slides by the pressing protrusion 163, pushes the coupling protrusion 150c of the lever 150 so as to rotate the lever 150, the pusher 150a of the lever 150 may protrude to the outside of the case 101 through the opening 101b of the case 101 and push the front surface 10a of the housing 10 to allow the door 30 to be separated from the housing 10.

Hereinafter the operation of the door opening and closing apparatus 100 will be described in detail with reference to the drawings.

Figure 8:
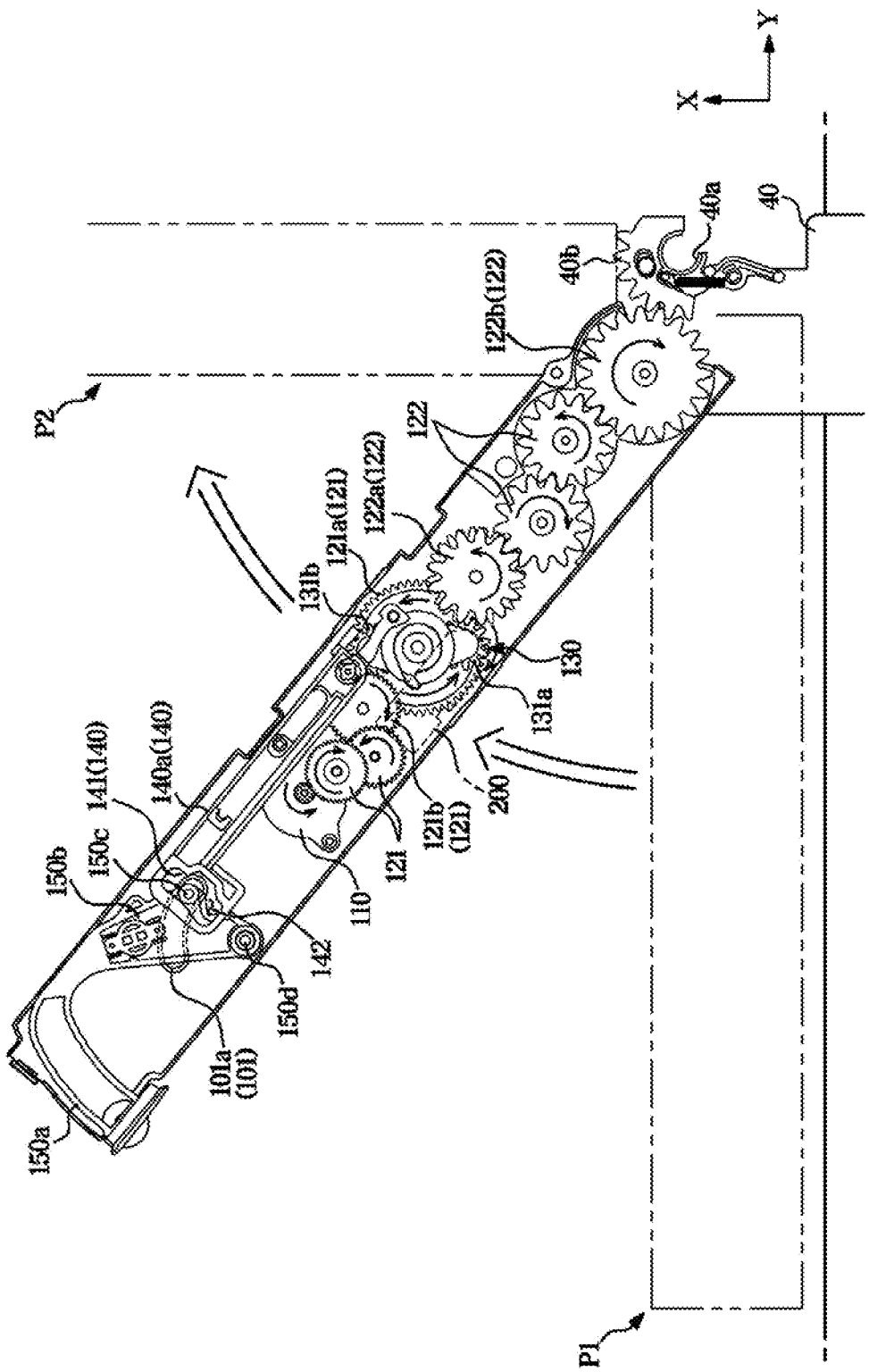
FIG. 8 is a view illustrating a state in which the door is being opened by the door opening and closing apparatus shown in FIG. 4 according to an embodiment of the present disclosure.
Figure 9:
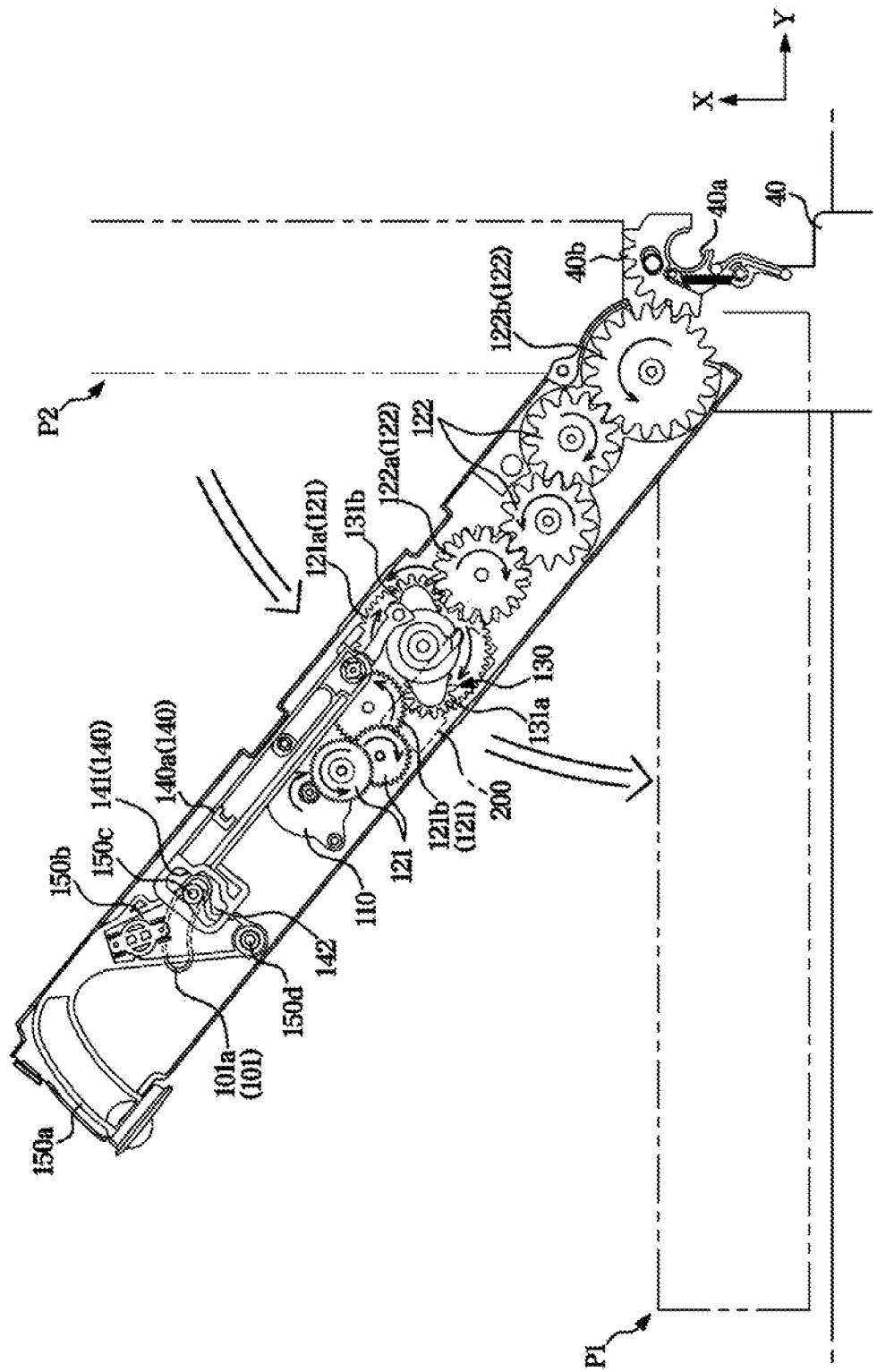
FIG. 9 is a view illustrating a state in which the door is being closed by the door opening and closing apparatus shown in FIG. 4 according to an embodiment of the present disclosure.
Figure 10:
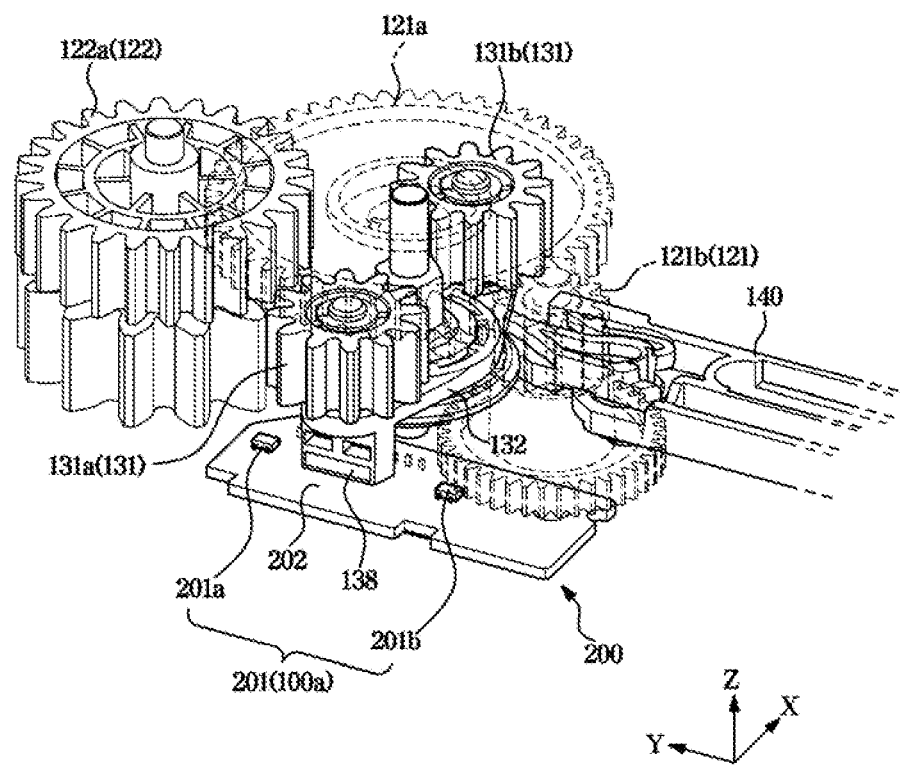
FIG. 10 is a view schematically illustrating a state in which a gear assembly of the door opening and closing apparatus shown in FIG. 2 is positioned at a neutral position according to an embodiment of the present disclosure.
Figure 11:
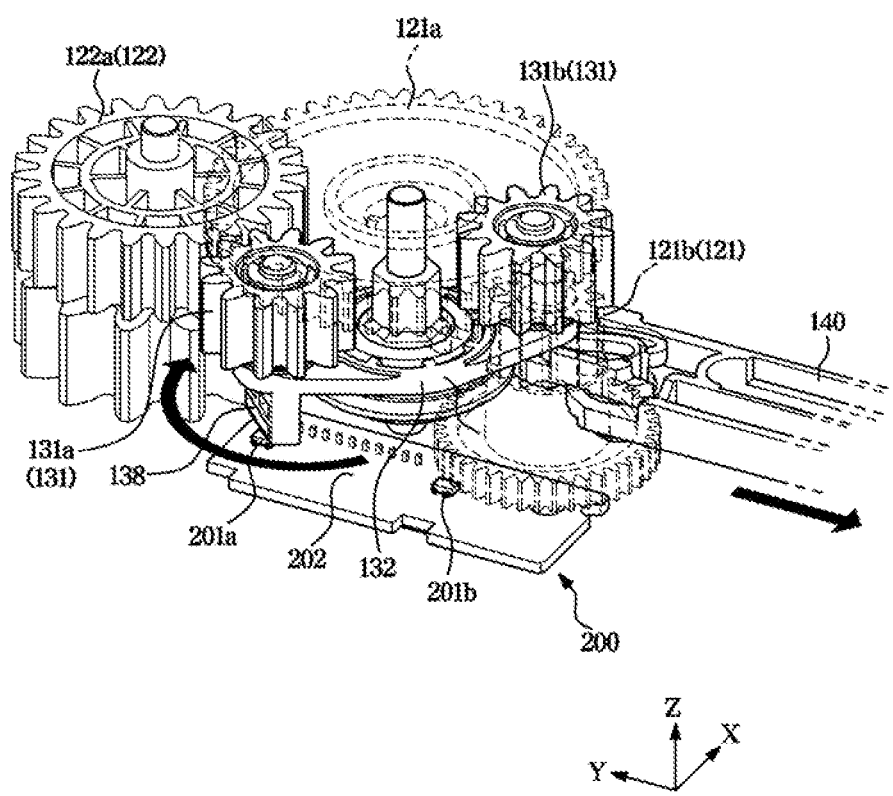
FIG. 11 is a view schematically illustrating a state in which the gear assembly of the door opening and closing apparatus shown in FIG. 2 is positioned at a first interlocking position according to an embodiment of the present disclosure.
Figure 12:
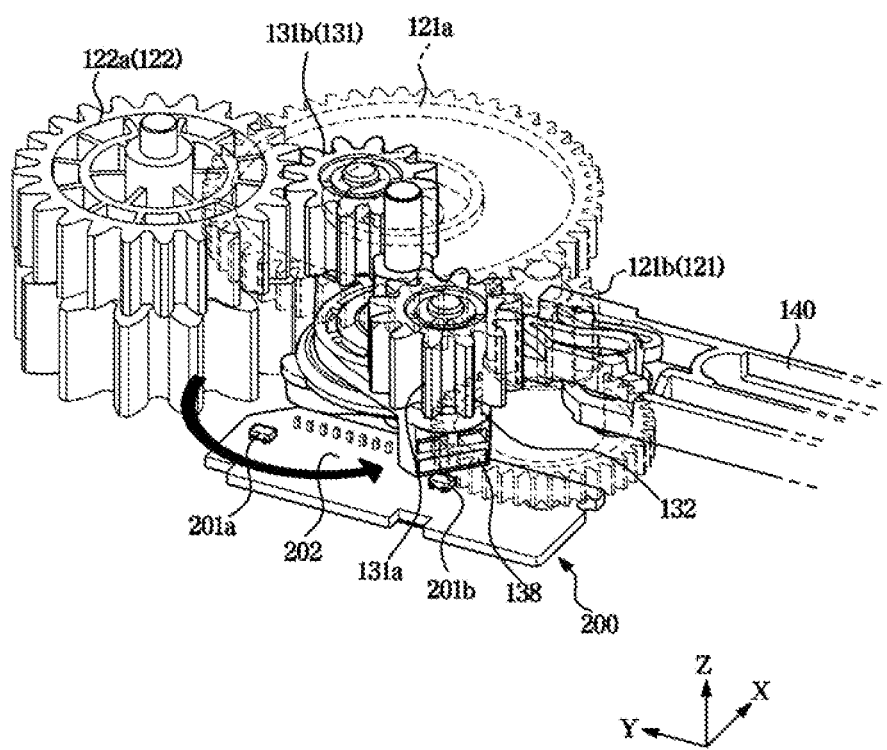
FIG. 12 is a view schematically illustrating a state in which the gear assembly of the door opening and closing apparatus shown in FIG. 2 is positioned at a second interlocking position according to an embodiment of the present disclosure.

FIG. 7 is a view illustrating a state in which a door is being separated from a housing by the door opening and closing apparatus shown in FIG. 4. FIG. 8 is a view illustrating a state in which the door is being opened by the door opening and closing apparatus shown in FIG. 4. FIG. 9 is a view illustrating a state in which the door is being closed by the door opening and closing apparatus shown in FIG. 4. FIG. 10 is a view schematically illustrating a state in which a gear assembly of the door opening and closing apparatus shown in FIG. 2 is positioned at a neutral position. FIG. 11 is a view schematically illustrating a state in which the gear assembly of the door opening and closing apparatus shown in FIG. 2 is positioned in a first interlocking position. FIG. 12 is a view schematically illustrating a state in which the gear assembly of the door opening and closing apparatus shown in FIG. 2 is positioned at a second interlocking position.

Referring to FIGS. 7 to 12, the door 30 may be rotated by the drive motor 110 of the door opening and closing apparatus 100 coupled to the door 30. In response to the rotation of the drive motor 110 in a first direction, the door 30 may be rotated in the first direction, and in response to the rotation of the drive motor 110 in a second direction, the door 30 may be rotated in the second direction. However, the disclosure is not limited thereto, and according to the number of hinge-side gears 122 and the number of motor-side gears 121, in response to the rotation of the drive motor 110 in the first direction, the door 30 may be rotated in the second direction, and in response to the rotation of the drive motor 110 in the second direction, the door 30 may be rotated in the first direction.

Hereinafter it is assumed that in response to the rotation of the drive motor 110 in the first direction corresponding to the counterclockwise direction based on FIGS. 7 to 9 illustrating that the door opening and closing apparatus 100 is viewed from the bottom direction, the door 30 may be rotated in the direction in which the door 30 is opened, and in response to the rotation of the drive motor 110 in the second direction corresponding to the clockwise direction based on FIGS. 7 to 9 illustrating that the door opening and closing apparatus 100 is viewed from the bottom direction, the door 30 may be rotated in the direction in which the door 30 is closed.

The rotation direction and speed of the drive motor 110 may be controlled by a controller (not shown). The controller may directly or indirectly receive an operation signal transmitted by an inputter (not shown). In addition, the controller may receive a detection signal that the position detection sensor 110a transmits in response to detection of the detection target 100b, and control the rotation of the drive motor 110 based on the detection signal. The controller may be arranged on the printed circuit board 200, or arranged at another position of the door opening and closing apparatus 100, or arranged in the housing 10. The inputter may be arranged in the housing 10 or a separate input device, or a mobile terminal. When the inputter is arranged in a separate input device, or a mobile terminal, the inputter may wirelessly transmit an operation signal to the controller. However, this example of the inputter is not limited thereto.

The door 30 may be automatically moved to an open position P2, in which the door 30 opens the storage compartment 20, by the door opening and closing apparatus 100. In this case, the open position P2 may correspond to a position of the door 30 in which the door 30 is rotated by a predetermined angle in the direction of opening the storage compartment 20 from a closed position P1 for closing the storage compartment 20. That is, the door 30 may be switched from the state in which the door 30 closes the storage compartment 20 to the open position P2 in which the door 30 opens the storage compartment 20.

In response to the door 30 being in the closed position P1, the gear assembly 130 may be located in a neutral position. The neutral position corresponds to a position in which the first and second clutch gears 131a and 131b of the gear assembly 130 mesh only with the center gear 121a and do not mesh with the hinge-side gear 122a.

In response to the gear assembly 130 being in the neutral position, the magnet 138 corresponding to the detection target 100b is positioned between a first Hall sensor 201a between a second Hall sensor 201b that correspond to the plurality of position detection sensors 100a, and the magnet 138 is not detected by the first Hall sensor 201a and the second Hall sensor 201b. That is, the magnet 138 and one end of the support frame 132, to which the magnet 138 is fixed, may be arranged to be spaced apart from a lateral side of the first Hall sensor 201a, and arranged to be spaced apart from a lateral side of the second Hall sensor 201b. Therefore, the magnet 138 is not detected by the first Hall sensor 201a and the second Hall sensor 201b. In other words, the magnet 138 and one end of the support frame 132 to which the magnet 138 is fixed do not face the first Hall sensor 201a and do not face the second Hall sensor 201b. Because the magnet 138 is not detected by any Hall sensor 201, the first Hall sensor 201a and the second Hall sensor 201b do not transmit a detection signal.

In this case, a region positioned between the first Hall sensor 201a and the second Hall sensor 201b may correspond to a neutral region 202. The neutral region 202 may include a portion of the printed circuit board 200 that is positioned between the first Hall sensor 201a and the second Hall sensor 201b and in which the Hall sensor 201 is not arranged. When the magnet 138 is positioned above the neutral region 202, the magnet 138 is not detected by the first Hall sensor 201a and the second Hall sensor 201b.

In response to receiving the operation signal from the inputter, the door opening and closing apparatus 100 may rotate the door 30 from the closed position P1 to the open position P2. Particularly, the operation signal of the inputter may include an opening signal for rotating the door 30 from the closed position P1 to the open position P2 and a closing signal for rotating the door 30 from the open position P2 to the closed position P1. In response to receiving the opening signal from the inputter, the controller may rotate the door 30 from the closed position P1 to the open position P2.

In response to receiving the opening signal from the inputter, the controller may rotate the drive motor 110 to the first direction. The power of the drive motor 110 may be transmitted to the motor-side gears 121, and the motor-side gear 121b meshing with the center gear 121a may transmit the power of the drive motor 110 to the center gear 121a.

In response to the rotation of the center gear 121a, the operation frame 160 provided to be rotated together with the center gear 121a may be also rotated. In response to the rotation of the operation frame 160, the pressing protrusion 163 of the operation frame 160 may press the pressed member 143 of the slider 140, the slider 140 may slide toward the lever 150, and the lever 150 may protrude from the case 101 to separate the door 30 from the housing 10. At the same time, one gear 122b of the hinge-side gears meshes with the hinge gear 40b. However, the disclosure is not limited thereto, and the hinge-side gear 122b may be provided to be continuously connected to the hinge gear 40b regardless of the position of the door 30.

Even after the door 30 is separated from the housing 10 by the lever 150, the drive motor 110 continues to rotate in the first direction. By the rotation of the drive motor 110, the gear assembly 130 may be moved from the neutral position to an interlocking position.

Particularly, due to the rotation of the center gear 121a, the pair of clutch gears 131 may revolve around the center gear 121a, and one of the pair of clutch gears 131 may be interlocked with the one hinge-side gear 122a of the hinge-side gears 122. In this case, in order to make it difficult to rotate the respective clutch gears 131a and 131b with respect to the clutch gear mounting shaft 134, the pressing spring 135 and the pressing member 136 may apply a load to the rotation of the clutch gears 131a and generate a torque for revolving the pair of clutch gears 131 around the rotation axis of the center gear 121a.

The interlocking position may include a first interlocking position in which the first clutch gear 131a of the gear assembly 130 meshes with the center gear 121a and the hinge-side gear 122, and a second interlocking position in which the second clutch gear 131b of the gear assembly 130 meshes with the center gear 121a and the hinge-side gear 122.

Further, while the gear assembly 130 is moved to the interlocking position, the slider 140 may return to a position, in a state before being pressed by the pressing protrusion 163, by the motor or the elastic member, and the lever 150 may be rotated by the motor or the elastic member and then the pusher 150a of the lever 150 may be accommodated in the case 101. That is, the lever 150 and the slider 140 may return to the state in which the door 30 is in the closed position P1.

Referring to FIGS. 8 and 11, in response to the drive motor 110 being rotated in the first direction by the opening signal of the inputter, the first clutch gear 131a may mesh with the center gear 121a and the hinge-side gear 122a, and the second clutch gear 131b may mesh only with the center gear 121a and may not mesh with other gears. That is, while the door 30 is being opened, the first clutch gear 131a transmits the power to the hinge-side gear 122a.

At this time, the magnet 138 provided under the first clutch gear 131a may also revolve around the rotation axis of the center gear 121a to be positioned on an upper side of the first Hall sensor 201a so as to face the first Hall sensor 201a, and accordingly, the magnet 138 may be detected by the first Hall sensor 201a.

The controller may receive a detection signal transmitted from the first Hall sensor 201a, and the controller may determine that the gear assembly 130 is located at the first interlocking position. The controller may determine that the door 30 is being rotated from the closed position P1 to the open position P2 while the detection signal of the first Hall sensor 201a is received.

The gear assembly 130 at the first interlocking position may transmit the power of the drive motor 110, which rotates in the first direction, to the hinge-side gear 122, and the hinge-side gear 122 may transmit the power of the drive motor 110 to the hinge gear 40b. Particularly, the first clutch gear 131a meshing with the hinge-side gear 122a may be rotated with respect to the clutch gear mounting shaft 134 in conjunction with the rotation of the center gear 121a, the hinge-side gear 122a meshing with the first clutch gear 131a may be rotated in conjunction with the rotation of the first clutch gear 131a, and the hinge-side gear 122b meshing with the hinge gear 40b may be rotated around the hinge gear 40b fixed to the hinge shaft 40a. Accordingly, the door 30 may be rotated toward the open position P2 with respect to the hinge shaft 40a. The drive motor 110 may be rotated in the first direction until the door 30 is positioned at the open position P2.

In response to the door 30 reaching the open position P2, the controller may control the drive motor 110 to position the gear assembly 130 to the neutral position. Particularly, as the opening of the door 30 is completed, the controller may determine that the door 30 reaches the open position P2 based on the number of rotations of the drive motor 110 and through a separate sensor configured to detect that the door 30 is positioned at the open position. The controller may rotate the drive motor 110 to the second direction to prevent the first Hall sensor 201a from transmitting the detection signal. That is, the drive motor 110 may be rotated in the second direction to allow the magnet 138 to be moved to the neutral region 202, and accordingly, the gear assembly 130 may be positioned at the neutral position, and the first clutch gear 131a may be separated from the hinge-side gear 122a.

In comparison with a case in which the hinge gear 40b and the drive motor 110 are interlocked by the gear assembly 130, a user can rotate the door 30 with a less force when the hinge gear 40b is not interlocked with drive motor 110. Therefore, after the rotation of the door 30 for reaching the open position P2 is completed, the first clutch gear 131a may be separated from the hinge-side gear 122b. Therefore, while the door 30 is manually closed by the user, it is possible to prevent that the drive motor 110 is interlocked with the hinge gear 40b to act as a resistance, and thus the user can easily rotate the door 30 from the open position P2 to the closed position P1.

In response to receiving the operation signal of the inputter, the door opening and closing apparatus 100 may rotate the door 30 from the open position P2 to the closed position P1. Particularly, in response to receiving the closing signal of the inputter, the controller of the door opening and closing apparatus 100 may rotate the door 30 from the open position P2 to the closed position P1.

In response to receiving the closing signal from the inputter, the controller may rotate the door 30 to the second direction. The power of the drive motor 110 may be transmitted to the motor-side gears 121, and the motor-side gear 121b meshing with the center gear 121a may transmit the power of the drive motor 110 to the center gear 121a.

The drive motor 110 continues to rotate in the second direction. By the rotation of the drive motor 110, the gear assembly 130 may be moved from the neutral position to the interlocking position.

Referring to FIGS. 9 and 12, in response to the drive motor 110 being rotated in the second direction by the closing signal of the inputter, the second clutch gear 131b may mesh with the center gear 121a and the hinge-side gear 122a, and the first clutch gear 131a may mesh only with the center gear 121a and may not mesh with other gears. That is, while the door 30 is being closed, the second clutch gear 131b transmits the power to the hinge-side gear 122a.

At this time, the magnet 138 provided under the first clutch gear 131a may also revolve around the rotation axis of the center gear 121a to be positioned on an upper side of the second Hall sensor 201b so as to face the second Hall sensor 201b, and accordingly, the magnet 138 may be detected by the second Hall sensor 201b.

The controller may receive a detection signal transmitted from the second Hall sensor 201b, and the controller may determine that the gear assembly 130 is located at the second interlocking position. The controller may determine that the door 30 is being rotated from the open position P2 to the closed position P1 while the detection signal of the second Hall sensor 201b is received.

The gear assembly 130 at the second interlocking position may transmit the power of the drive motor 110, which rotates in the second direction, to the hinge-side gear 122, and the hinge-side gear 122 may transmit the power of the drive motor 110 to the hinge gear 40b. Particularly, the second clutch gear 131b meshing with the hinge-side gear 122a may be rotated with respect to the clutch gear mounting shaft 134 in conjunction with the rotation of the center gear 121a, the hinge-side gear 122a meshing with the second clutch gear 131b may be rotated in conjunction with the rotation of the second clutch gear 131b, and the hinge-side gear 122*b* meshing with the hinge gear 40*b* may be rotated around the hinge gear 40*b* fixed to the hinge shaft 40*a*. Accordingly, the door 30 may be rotated toward the closed position P1 about the hinge shaft 40*a*. The drive motor 110 may be rotated in the second direction until the door 30 is positioned at the closed position P1.

In response to the door 30 reaching the closed position P1, the controller may control the drive motor 110 to position the gear assembly 130 to the neutral position. Particularly, as the closing of the door 30 is completed, the controller may determine that the door 30 reaches the closed position P1 based on the number of rotations of the drive motor 110 and through a separate sensor configured to detect that the door 30 is positioned at the closed position. The controller may rotate the drive motor 110 to the first direction to prevent the second Hall sensor 201*b* from transmitting the detection signal. That is, the drive motor 110 may be rotated in the first direction to allow the magnet 138 to be moved to the neutral region 202, and accordingly, the gear assembly 130 may be positioned at the neutral position, and the second clutch gear 131*b* may be separated from the hinge-side gear 122.

Hereinbefore it has been described that the gear assembly 130 is positioned at the first interlocking position to open the door 30, and the gear assembly 130 is positioned at the second interlocking position to close the door 30 with reference to FIGS. 8 to 12.

However, the disclosure is not limited thereto, and the gear assembly 130 may be positioned at the second interlocking position to open the door 30, and the gear assembly 130 may be positioned at the first interlocking position to close the door 30. In this case, the controller may determine that the door 30 is being closed while the detection signal of the first Hall sensor 201*a* is received, and the controller may determine that the door 30 is being opened while the detection signal of the second Hall sensor 201*b* is received.

As another example, the door opening and closing device 100 may further include a third position detection sensor 100*a* additionally provided on the neutral region 202. The third position detection sensor may detect the detection target 100*b* in response to the gear assembly 130 being positioned at the neutral position, and the third position detection sensor may transmit a detection signal. In this case, the controller may determine that the gear assembly 130 is positioned at the neutral position while the detection signal of the third position detection sensor is received.

Alternatively, the door opening and closing apparatus 100 may include only the third position detection sensor 100*a* configured to detect the detection target 100*b* in response to the gear assembly 130 being positioned at the neutral position, and configured to transmit a detection signal, but exclude the first position detection sensor 100*a* and the second position detection sensor 100*a* that are configured to detect whether the gear assembly 130 is positioned at the interlocking position. In this case, while the detection signal of the third position detection sensor is received, the controller may determine that the gear assembly 130 is positioned at the neutral position, and while the detection signal of the third position detection sensor is not received, the controller may determine that the gear assembly 130 is positioned at the interlocking position.

In comparison with a case in which the hinge gear 40*b* and the drive motor 110 are interlocked by the gear assembly 130, a user can rotate the door 30 with a less force when the hinge gear 40*b* is not interlocked with drive motor 110. Therefore, after the rotation of the door 30 for reaching the closed position P1 is completed, the second clutch gear 131*b* may be separated from the hinge-side gear 122. Therefore, while the door 30 is manually opened by the user, it is possible to prevent that the drive motor 110 is interlocked with the hinge gear 40*b* to act as a resistance, and thus the user can easily rotate the door 30 from the closed position to the open position.

Further, it is appropriate that the second clutch gear 131*b* is immediately separated from the hinge-side gear 122*a* as the drive motor 110 starts to rotate to the first direction when the gear assembly 130 is switched from the second interlocking position to the neutral position as the door 30 reaches the closed position P1. However, due to the load of the hinge-side gear 122*a* meshing with the second clutch gear 131*b*, the second clutch gear 131*b* may not revolve around the center gear 121*a* even though the center gear 121*a* is rotated, and thus only the pressing protrusion 163, which is rotated together with the center gear 121*a*, may be rotated.

In this case, in comparison with the case in which the second clutch gear 131*b* is immediately separated from the hinge-side gear 122*a* according to the rotation of the drive motor 110, an angle, in which the pressing protrusion 163 is rotated until the gear assembly 130 reaches the neutral position, is increased.

Referring to FIGS. 6 and 7, a separation space 142 may be formed between an inner surface of the coupling groove 141 of the slider 140 and the coupling protrusion 150*c* of the lever 150. That is, when the slider 140 is not pressed by the pressing protrusion 163, the coupling protrusion 150*c* may be spaced apart from a hinge-side inner surface 141*a* of the coupling groove 141 toward an extending direction of the extension 140*a* by a separation distance h. The hinge-side inner surface 141*a* of the coupling groove 141 may correspond to a portion, which is adjacent to the hinge 40, on the inner surface of the coupling groove 141, and a portion in contact with the coupling protrusion 150*c* when the lever 150 starts to rotate by the slider 140. The separation distance h may correspond to a sum of a first distance at which the slider 140 slides by the coupling protrusion 150*c* that rotates independently in the state in which the second clutch gear 131*b* meshes with the hinge-side gear 122, and a second distance at which the slider 140 slides by the coupling protrusion 150*c* that rotates from when the second clutch gear 131*b* is separated from the hinge-side gear 122 until the second clutch gear 131*b* is positioned at the neutral position.

As mentioned above, because a free space is formed between the coupling groove 141 and the coupling protrusion 150*c*, it is possible to prevent the door 30 from being opened by the lever 150 that is unintentionally pushed by the slider 140 by the pressing protrusion 163 that is rotated together with the center gear 121*a* when the center gear 121*a* is rotated to rotate the gear assembly 130 from the second interlocking position to the neutral position, or it is possible to prevent that the gear assembly 130 is not switched to the neutral position and manually opened at the interlocking position as the rotation of the pressing protrusion 163 and the center gear 121*a* is limited by the lever 150 and the slider 140 in which a movement thereof is limited by the housing 10.

Figure 13:
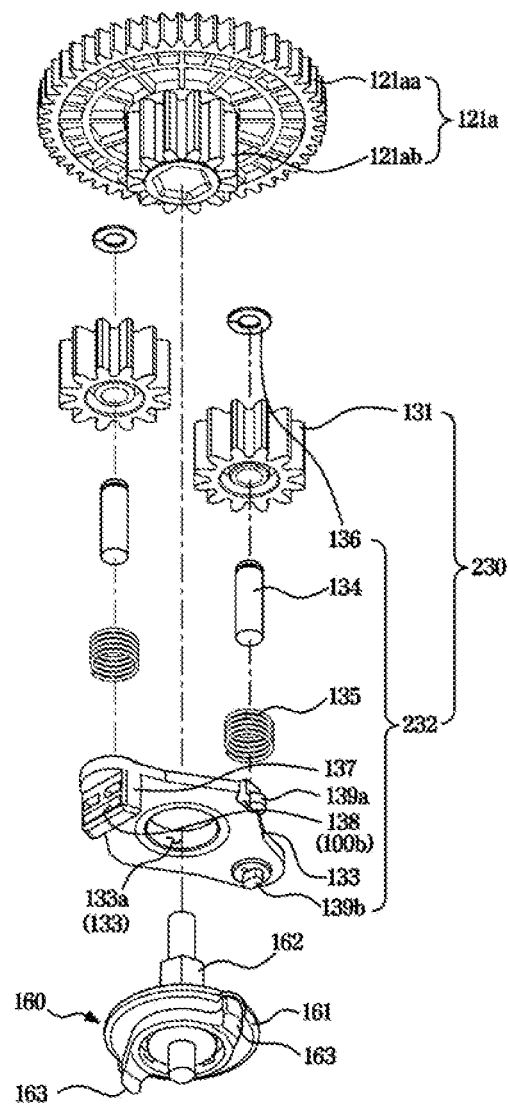
FIG. 13 is a view illustrating a gear assembly according to an embodiment of the present disclosure.
Figure 14:
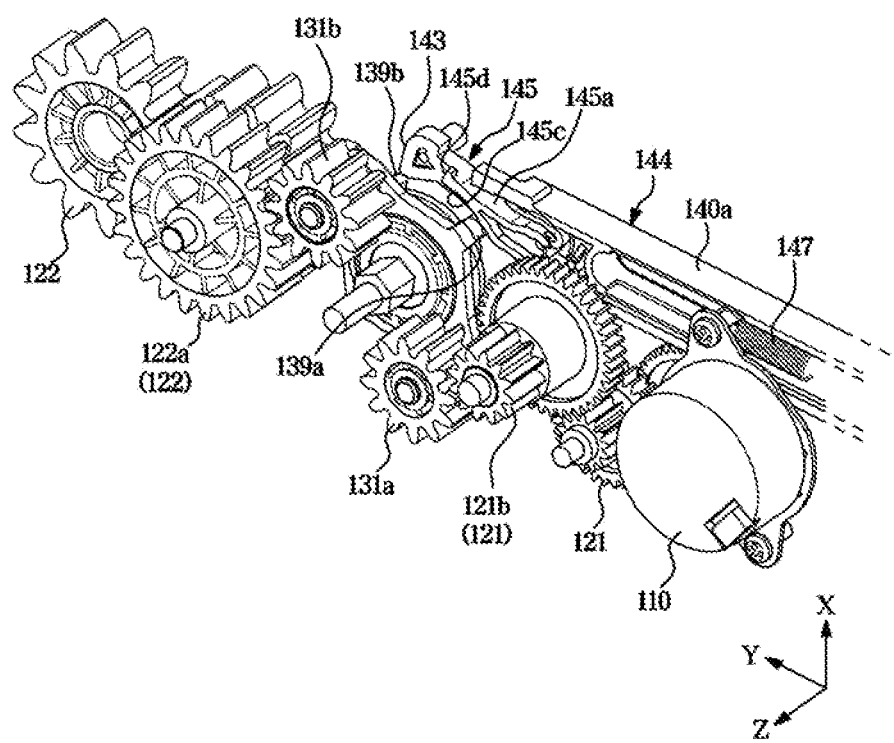
FIG. 14 is a view schematically illustrating a state in which the gear assembly shown in FIG. 13 is positioned at a second interlocking position according to an embodiment of the present disclosure.
Figure 15:
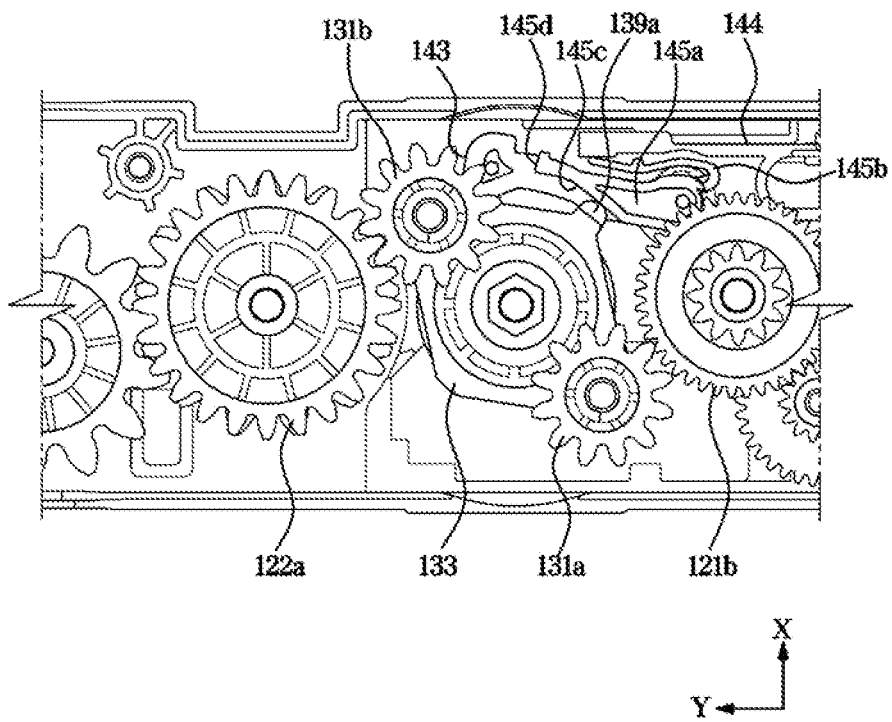
FIG. 15 is a top view illustrating the gear assembly shown in FIG. 14 according to an embodiment of the present disclosure.
Figure 16:
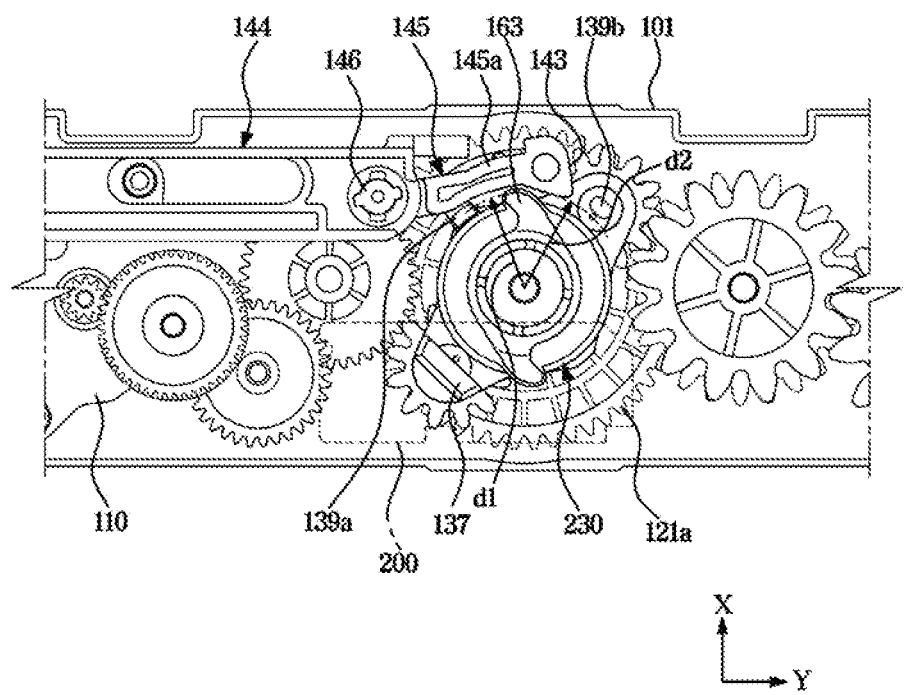
FIG. 16 is a bottom view illustrating the gear assembly shown in FIG. 14.
Figure 17:
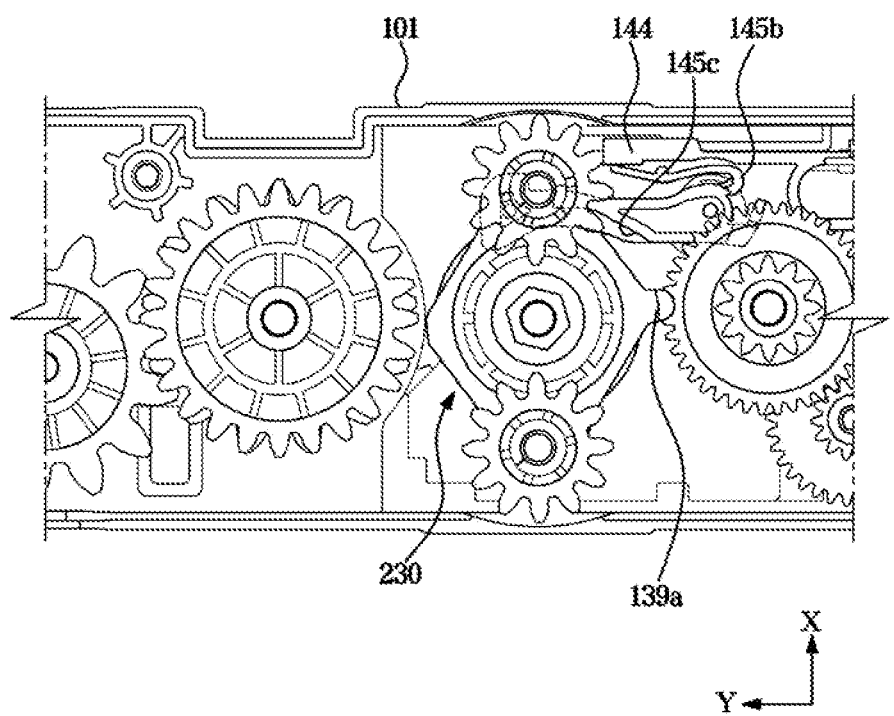
FIG. 17 is a top view illustrating a state in which the gear assembly shown in FIG. 13 is positioned at a neutral position.
Figure 18:
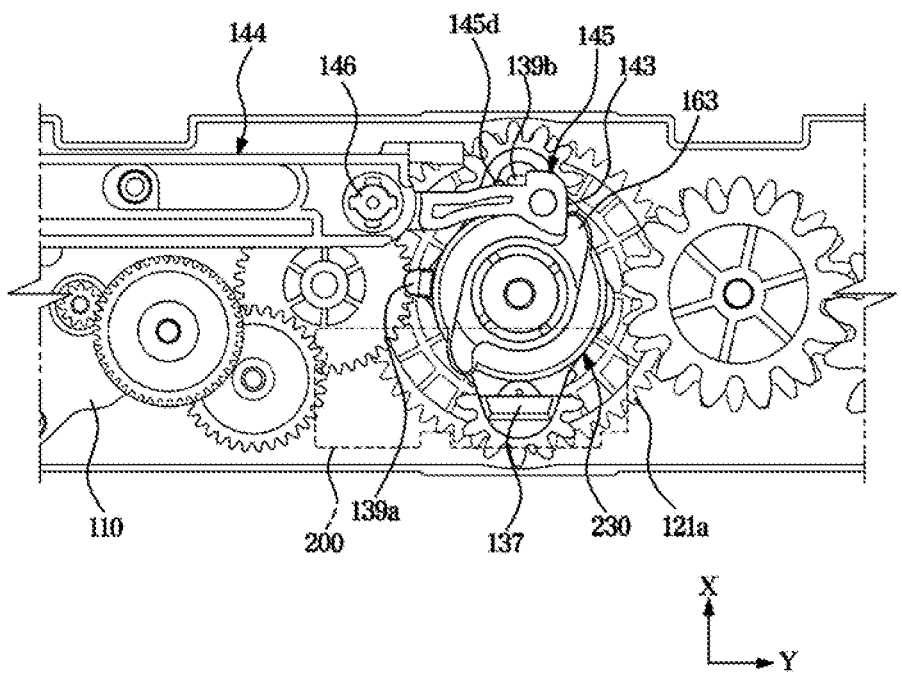
FIG. 18 is a bottom view illustrating the gear assembly shown in FIG. 17 according to an embodiment of the present disclosure.
Figure 19:
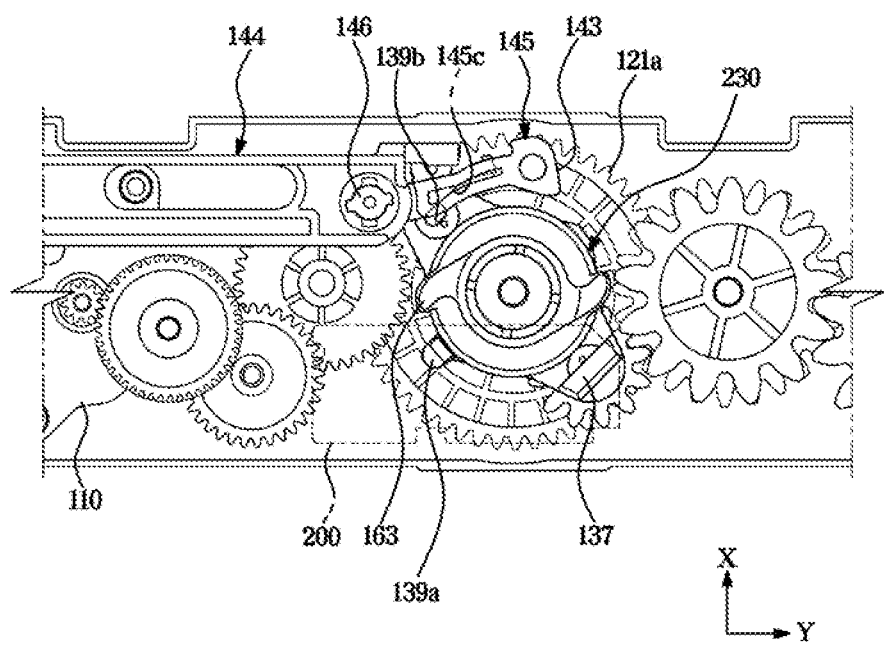
FIG. 19 is a bottom view illustrating a state in which the gear assembly shown in FIG. 13 is positioned at a first interlocking position according to an embodiment of the present disclosure.

FIG. 13 is a view illustrating a gear assembly according to another embodiment of the present disclosure. FIG. 14 is a view schematically illustrating a state in which the gear assembly shown in FIG. 13 is positioned at a second interlocking position. FIG. 15 is a top view illustrating the gear assembly shown in FIG. 14. FIG. 16 is a bottom view illustrating the gear assembly shown in FIG. 14. FIG. 17 is a top view illustrating a state in which the gear assembly shown in FIG. 13 is positioned at a neutral position. FIG. 18 is a bottom view illustrating the gear assembly shown in FIG. 17. FIG. 19 is a bottom view illustrating a state in which the gear assembly shown in FIG. 13 is positioned at a first interlocking position.

Hereinafter a case in which the door opening and closing apparatus 100 shown in FIG. 1 includes a gear assembly 230 shown in FIG. 13 will be described with reference to FIGS. 13 to 19. Although the center gear 121a and the printed circuit board 200 are not illustrated in FIGS. 14, 15, and 17, it should be understood to include the center gear 121a and the printed circuit board 200. A description of the content the same as the above will be omitted.

The slider 140 may include a slider bar 144 including an extension 140a and a coupling groove 141, and an intermittent member 145 rotatably coupled to one end of the slider bar 144 and including a pressed member 143. The intermittent member 145 may selectively transmit the power of the motor 110, which is transmitted by the rotation of the center gear 121a and the operation frame 160, to the slider 140.

The intermittent member 145 may include a body 145a in which a rotating shaft 146 is provided at one end thereof so as to be rotatably coupled to the slider bar 144 and the pressed member 143 is arranged at the other end thereof, an elastically deformable member 145b connected to the one end of the body 145a in which the rotating shaft 146 is provided, and including the other end thereof supported by the slider bar 144, and provided to apply an elastic force to the body 145a, and a pressed surface 145c formed in the body 145a.

A support frame 232 may include a first support protrusion 139a formed on one side of the plate 133. The first support protrusion 139a may be in contact with the pressed surface 145c of the intermittent member 145 to press the pressed surface 145c. The intermittent member 145 may be rotated about the rotating shaft 146 as the pressed surface 145c is pressed by the first support protrusion 139a.

The first support protrusion 139a may be arranged in such a way that a straight line connecting a rotation center of the support frame 232 to the first support protrusion 139a is perpendicular to a straight line connecting the rotation center of the support frame 232 to the magnet receiver 137. A lower surface of the first support protrusion 139a may be located lower than a lower surface of the plate 133.

In response to the gear assembly 230 being at the second interlocking position to close the door 30, the first support protrusion 139a may press the pressed surface 145c of the intermittent member 145. The intermittent member 145 pressed by the first support protrusion 139a may be rotated in one direction about the rotating shaft 146 while the elastically deformable member 145b is elastically deformed (hereinafter referred to as a pressing state).

In the pressing state of the intermittent member 145, a distance d2 from the rotation center of the gear assembly 230 to one end of the pressed member 143 closest to the rotation center of the gear assembly 230 is greater than a distance d1 from the rotation center of the gear assembly 230 to one end of the pressing protrusion 163 furthest from the rotation center of the gear assembly 230. Accordingly, the pressing protrusion 163 may be in a state of not pressing the pressed member 143 and the operation frame 160 may be continuously rotated in conjunction with the rotation of the center gear 121a without operating the slider 140.

While the gear assembly 230 is moved from the second interlocking position to the neutral position, the support frame 232 also rotates. As the support frame 232 rotates from the second interlocking position to the neutral position, the first support protrusion 139a may also rotate about the rotation axis of the gear assembly 230, and the support protrusion 139a may not press the pressed surface 145c until the gear assembly 230 is adjacent to the neutral position. As the pressure by the first support protrusion 139a disappears, the intermittent member 145 may be rotated in the other direction by a restoring force of the elastically deformable member 145b and return to its original position (hereinafter referred to as a non-pressing state).

In the non-pressing state of the intermittent member 145, the distance d2 from the rotation center of the gear assembly 230 to one end of the pressed member 143 closest to the rotation center of the gear assembly 230 is less than the distance d1 from the rotation center of the gear assembly 230 to one end of the pressing protrusion 163 furthest from the rotation center of the gear assembly 230. Accordingly, the pressed member 143 may be in a state of being pressed by the pressing protrusion 163 and as the operation frame 160 is further rotated, the pressing protrusion 163 may press the pressed member 143 to allow the slider 140 to slide.

As mentioned above, the first support protrusion 139a may maintain the intermittent member 145 in the pressing state while the gear assembly 230 is moved from the second interlocking position to the neutral position. The first support protrusion 139a may maintain the intermittent member 145 in the non-pressing state until the gear assembly 230 reaches the neural position, so as to allow the slider 140 to be operable. Therefore, while the gear assembly 230 is moved from the second interlocking position to the neutral position, it is possible to prevent the door 30 from being opened by the pressed member 143 that is unintentionally pressed or it is possible to prevent that the gear assembly 230 is not switched to the neutral position and manually opened at the interlocking position as the rotation of the pressing protrusion 163 and the center gear 121a is limited by the lever 150 and the slider 140 in which a movement thereof is limited by the housing 10.

The intermittent member 145 may include a stopper surface 145d formed on the body 145a. The stopper surface 145d may be formed to be connected to the pressed surface 145c.

The support frame 232 may include a second support protrusion 139b formed on a lower surface of the plate 133. The second support protrusion 139b may be in contact with the stopper surface 145d of the intermittent member 145 to stop the rotation of the gear assembly 230. The second support protrusion 139b may be in contact with the pressed surface 145c of the intermittent member 145 and press the pressed surface 145c. As the pressed surface 145c is pressed by the second support protrusion 139b, the intermittent member 145 may be rotated about the rotating shaft 146 and become the pressing state.

The second support protrusion 139b may be arranged on a straight line connecting the rotation center of the support frame 232 and the magnet receiver 137. The second support protrusion 139b may be arranged under the second clutch gear 131b.

In response to the rotation of the center gear 121a to switch the gear assembly 230 from the neural position to the first interlocking position, the second support protrusion 139b may be in contact with the stopper surface 145d and the movement of the support protrusion 139b may be limited by the stopper surface 145d. As the rotation of the second support protrusion 139b is blocked by the stopper surface 145d, the support frame 232 may not be rotated even when the center gear 121a is rotated. That is, the revolution of the clutch gear 131 is blocked. The reason that the revolution of the clutch gear 131 is blocked is that the clutch gear 131 revolves with a relatively small torque due to the load of the pressing member 136.

In response to the continuous rotation of the center gear 121a in this state, only the operation frame 160 may be independently rotated in a state in which the rotation of the gear assembly 230 is blocked. The rotation of the gear assembly 230 may be blocked by the stopper surface 145d until the pressing protrusion 163 comes into contact with the pressed member 143 and starts to push the pressed member 143. As the operation frame 160 is rotated, the pressing protrusion 163 may come into contact with the pressed member 143 and start to push the pressed member 143.

In addition, as the motor 110 rotates in the first direction, the pressing protrusion 163 presses the pressed member 143, the slider 140 slides toward the lever 150, and the lever 150 protrudes from the case 101 to separate the door 30 from the housing 10.

As the slider 140 slides, the intermittent member 145 also slides, and thus an interruption in the movement of the gear assembly 230 caused by the stopper surface 145d may disappear and the gear assembly 230 may be positioned at the first interlocking position.

In response to the gear assembly 230 being positioned at the first interlocking position, the slider 140 may be restored to a position, in a state before being pressed by the pressing protrusion 163, by a motor or an elastic member 147. At this time, the second support protrusion 139b may come into contact with the pressed surface 145c of the intermittent member 145 of the slider 140 that is being restored to its original position. The second support protrusion 139b may press the pressed surface 145c to allow the intermittent member 145 to be in the pressing state. Therefore, in the same manner as the first support protrusion 139a, the pressing protrusion 163 may not slide the slider 140 even when the operation frame 160 is rotated in conjunction with the center gear 121a that rotates to open the door 30.

The support frame 232 may include only the first support protrusion 139a, or include only the second support protrusion 139b, or include both the first support protrusion 139a and the second support protrusion 139b.

While the present disclosure has been particularly described with reference to exemplary embodiments, it should be understood by those of skilled in the art that various changes in form and details may be made without departing from the spirit and scope of the present disclosure.

What is claimed is:

1. A refrigerator, comprising:
a housing;
a door configured to be rotatable about a hinge shaft; and
a door opening and closing apparatus configured to open and close the door,
wherein the door opening and closing apparatus includes:
a drive motor,
a first gear configured to receive power from the drive motor,
a second gear, spaced apart from the first gear, configured to transmit a rotational force to the hinge shaft,
a clutch gear rotatable between a first position and a second position around a rotation axis of the first gear and configured so that,
in response to the clutch gear being rotated to the first position, the clutch gear transmits the power received from the first gear to the second gear which transmits the rotational force to the hinge shaft to open the door, and
in response to the clutch gear being rotated to the second position, the clutch gear transmits the power received from the first gear to the second gear which transmits the rotational force to the hinge shaft to close the door,
a support frame including a detection target and configured to support the clutch gear on a first side of the support frame and to support the detection target on a second side of the support frame which is opposite the first side,
a position detection sensor configured to detect the clutch gear being at the first position and the clutch gear being at the second position, and
the detection target is:
arranged along an axial direction of the clutch gear,
positioned to face the position detection sensor,
configured to be rotatable together with the clutch gear around the rotation axis of the first gear,
detectable by the position detection sensor to sense the clutch gear being at the first position and the clutch gear being at the second position, and
with the power received from the first gear being transmitted to the second gear by the clutch gear, maintained in a state of being detectable by the position detection sensor.

2. The refrigerator of claim 1, wherein:
the detection target is arranged along an axial direction of the clutch gear.

3. The refrigerator of claim 2, wherein
in response to the power of the first gear being transmitted to the second gear by the clutch gear, the detection target is positioned to face the position detection sensor so as to be detected by the position detection sensor.

4. The refrigerator of claim 3, wherein
in response to the power of the first gear not being transmitted to the second gear, the detection target is laterally spaced apart from the position detection sensor so as to be undetected by the position detection sensor.

5. The refrigerator of claim 2, wherein
the clutch gear includes a first clutch gear and a second clutch gear,
the position detection sensor includes a first position detection sensor and a second position detection sensor,
the second clutch gear is configured to be rotatable around the rotation axis of the first gear and transmit power of the first gear to the second gear based on a position of the second clutch gear around the rotation axis of the first gear; and
the second position detection sensor is spaced apart from the first position detection sensor and configured to detect the detection target.

6. The refrigerator of claim 5, wherein
the first clutch gear and the second clutch gear are connected to the first gear to receive power from the drive motor through the first gear; and
in response to the clutch gear being at the first position, the first clutch gear is connected to the second gear so as to transmit the power received from the first gear to the second gear and the second clutch gear is disconnected from the second gear, and
in response to the clutch gear being at the second position, the second clutch gear is connected to the second gear so as to transmit the power received from the first gear to the second gear and the first clutch gear is disconnected from the second gear.

7. The refrigerator of claim 6, wherein
while the door is being opened, the first clutch gear transmits the power received from the first gear to the second gear, and the detection target is positioned to face the first position detection sensor and detected by the first position detection sensor.

8. The refrigerator of claim 7, wherein
in response to completion of the door being opened, the first clutch gear is separated from the second gear, and the detection target is positioned in a neutral region between the first position detection sensor and the second position detection sensor, so as to be undetected by the first position detection sensor and the second position detection sensor.

9. The refrigerator of claim 6, wherein
while the door is being closed, the second clutch gear transmits power to the second gear, and the detection target is positioned to face the second position detection sensor and detected by the second position detection sensor.

10. The refrigerator of claim 9, wherein
in response to completion of the door being closed, the second clutch gear is separated from the second gear, and the detection target is positioned in a neutral region between the first position detection sensor and the second position detection sensor, so as to be undetected by the first position detection sensor and the second position detection sensor.

11. The refrigerator of claim 6, wherein
the first clutch gear is connected to the second gear in response to a rotation of the drive motor in a first direction, and the first clutch gear is separated from the second gear in response to the rotation of the drive motor in a second direction; and
the second clutch gear is connected to the second gear in response to the rotation of the drive motor in the second direction, and the second clutch gear is separated from the second gear in response to the rotation of the drive motor in the first direction.

12. The refrigerator of claim 11, wherein
the support frame is configured to support the first clutch gear and the second clutch gear on the first side of the support frame, the first clutch gear and the second clutch gear being configured to be rotatable around the rotation axis of the first gear.

13. The refrigerator of claim 1, wherein
the door opening and closing apparatus further includes:
a pressing protrusion configured to be rotatable together with the first gear,
a slider configured to extend in one direction and slide by being pressed by the pressing protrusion, and
a lever configured to be rotatable by the slider and push the housing to move the door which is closed to an opening direction,
the slider includes a coupling groove, and the lever includes a coupling protrusion, and
as the coupling protrusion is inserted into the coupling groove, the lever is coupled to the slider.

14. The refrigerator of claim 13, wherein
a separation space is formed between an inner surface of the coupling groove and the coupling protrusion,
wherein while the slider is not pressed by the pressing protrusion, the coupling protrusion is spaced apart from the inner surface of the coupling groove, in a direction in which the slider extends.

15. The refrigerator of claim 2, wherein
the position detection sensor includes a Hall sensor and the detection target comprises a magnet.

\* \* \* \* \*